US006966695B2

(12) United States Patent
Boomgaarden et al.

(10) Patent No.: US 6,966,695 B2
(45) Date of Patent: Nov. 22, 2005

(54) ADJUSTABLE PATIENT LATERAL SUPPORT

(75) Inventors: Jonathan C. Boomgaarden, Waukesha, WI (US); Douglas P. Dietz, Pewaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/063,429

(22) Filed: Apr. 23, 2002

(65) Prior Publication Data

US 2003/0202635 A1 Oct. 30, 2003

(51) Int. Cl.$^7$ .............................................. G03B 42/02
(52) U.S. Cl. ..................................... 378/177; 378/208
(58) Field of Search ............................... 378/177–180, 378/189, 190, 191, 192, 205, 208, 209, 195–197; 128/878, 879, 880, 881, 882; 5/601; 600/407, 600/425, 443–445

(56) References Cited

U.S. PATENT DOCUMENTS

| | | | | |
|---|---|---|---|---|
| 3,997,792 A | * | 12/1976 | Conrad et al. | 378/177 |
| 4,507,799 A | * | 3/1985 | Shimkus | 378/177 |
| 4,653,083 A | * | 3/1987 | Rossi | 378/196 |
| 4,979,202 A | * | 12/1990 | Siczek et al. | 378/198 |
| 5,014,292 A | * | 5/1991 | Siczek et al. | 378/196 |
| 5,226,068 A | * | 7/1993 | Strawder | 378/177 |
| 5,822,814 A | * | 10/1998 | Van der Ende | 5/601 |
| 6,155,713 A | * | 12/2000 | Watanabe | 378/197 |
| 6,282,264 B1 | * | 8/2001 | Smith et al. | 378/189 |
| 6,285,739 B1 | * | 9/2001 | Rudin et al. | 378/98.8 |
| 6,450,684 B2 | * | 9/2002 | Kobayashi | 378/177 |
| 6,496,558 B2 | * | 12/2002 | Graumann | 378/39 |

* cited by examiner

Primary Examiner—Allen C. Ho
(74) Attorney, Agent, or Firm—Fletcher Yoder

(57) ABSTRACT

The present technique provides a laterally adjustable patient support for a medical imaging system. The laterally adjustable patient support is attachable to a receptor for the medical imaging system via a lateral rail structure, which allows sliding movement along the lateral rail structure in infinitesimal increments. The lateral rail structure also may form a curvilinear path, such as a convex path, which provides additional angular and lateral adjustability of the laterally adjustable patient support. The laterally adjustable patient support also may use a supported weight of the patient to create a positional holding force between the laterally adjustable patient support and the receptor.

38 Claims, 8 Drawing Sheets

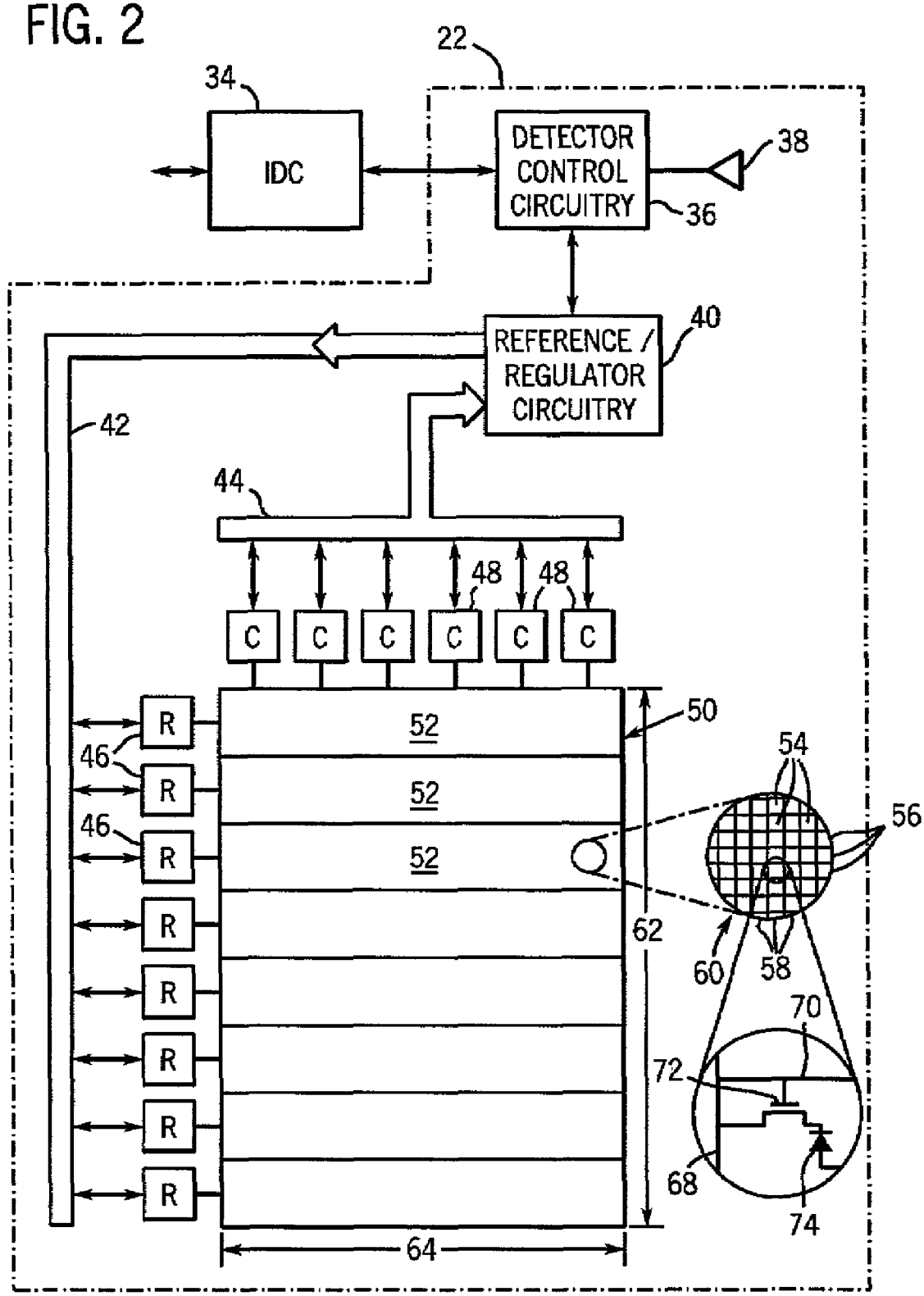

ADJUSTABLE PATIENT LATERAL SUPPORT

BACKGROUND OF INVENTION

The present invention relates generally to imaging systems, such as radiographic systems, and more particularly, to digital detectors used in such systems. Even more particularly, the present invention relates to an apparatus and method for supporting a patient's hands and arms in a non-obstructive location relative to the anatomy of interest.

Medical diagnostic and imaging systems are ubiquitous in modern health care facilities. Currently, a number of modalities exist for medical diagnostic and imaging systems. These include computed tomography (CT) systems, x-ray systems (including both conventional and digital/digitized imaging systems), magnetic resonance (MR) systems, positron emission tomography (PET) systems, ultrasound systems, nuclear medicine systems, and so forth. Such systems provide invaluable tools for identifying, diagnosing and treating physical conditions and greatly reduce the need for surgical diagnostic intervention. In many instances, these modalities complement one another and offer the physician a range of techniques for imaging particular types of tissue, organs, physiological systems, and so forth.

Digital imaging systems are becoming increasingly widespread for producing digital data that can be reconstructed into useful radiographic images. In one application of a digital imaging system, radiation from a source is directed toward a subject, typically a patient in a medical diagnostic application, and a portion of the radiation passes through the subject and impacts a detector. The surface of the detector converts the radiation to light photons, which are sensed. The detector is divided into an array of discrete picture elements or pixels, and encodes output signals based upon the quantity or intensity of the radiation impacting each pixel region. Because the radiation intensity is altered as the radiation passes through the subject, the images reconstructed based upon the output signals may provide a projection of tissues and other features similar to those available through conventional photographic film techniques. In use, the signals generated at the pixel locations of the detector are sampled and digitized. The digital values are transmitted to processing circuitry where they are filtered, scaled, and further processed to produce the image data set. The data set may then be used to reconstruct the resulting image, to display the image, such as on a computer monitor, to transfer the image to conventional photographic film, and so forth.

The foregoing medical diagnostic and imaging systems often require patient support structures to orient the anatomy of interest relative to the imaging detector. In some imaging procedures, such as lateral radiographs of a standing patient, a support structure is necessary to position the patient's hands and arms so that they do not obstruct the anatomy of interest. The patient's hands and arms are typically supported either by an apparatus unrelated to the diagnostic imaging equipment, such as an intravenous (IV) pole with sand bags at the base for stability, or by a support attached to the diagnostic imaging equipment. Unfortunately, these support structures provide very little adjustability. Support structures mounted to the diagnostic imaging equipment typically provide adjustability only by pivoting the support or by removing and reattaching the support in one of a number of support positions.

Accordingly, a need exists for a laterally adjustable patient support that is adjustable at infinitesimal increments across a detector of an imaging system.

SUMMARY OF INVENTION

The present technique provides a laterally adjustable patient support for a medical imaging system. The laterally adjustable patient support is attachable to a receptor for the medical imaging system via a lateral rail structure, which allows sliding movement along the lateral rail structure in infinitesimal increments. The lateral rail structure also may form a curvilinear path, such as a convex path, which provides additional angular and lateral adjustability of the laterally adjustable patient support. The laterally adjustable patient support also may use a supported weight of the patient to create a positional holding force between the laterally adjustable patient support and the receptor.

In one aspect, the present technique provides a patient support system for a medical imaging system. The patient support system comprises a lateral rail structure attachable to a receptor of the medical imaging system and a patient support movably coupled to the lateral rail structure via a rail guide structure.

In another aspect, the present technique provides a patient support for an imaging system having a curvilinear rail structure attachable to, and movable with, a radiographic receptor of the imaging system. A limb support is then slidingly coupled to the curvilinear rail structure.

In another aspect, the present technique provides a medical imaging system having a radiographic receptor. On the radiographic receptor, a patient extremity support is slidingly coupled to a rail structure.

In another aspect, the present technique provides a method of supporting a patient limb during image acquisition by a medical imaging system. The method comprises the act of sliding a limb support along a rail structure coupled to, and movable with, a radiographic receptor of the medical imaging system. The limb support is then secured in a desired position along the rail structure.

In another aspect, the present technique provides a method of forming a laterally adjustable limb support for a medical imaging system. The method comprises the act of providing a lateral rail structure attachable to a receptor of the medical imaging system. The limb support is slidingly coupled to the lateral rail structure.

In another aspect, the present technique provides a patient support structure for a medical imaging system. The patient support structure has patient support means for supporting a patient extremity, while sliding attachment means are provided for coupling the patient support means to a receptor of the medical imaging system.

BRIEF DESCRIPTION OF DRAWINGS

The foregoing and other advantages and features of the invention will become apparent upon reading the following detailed description and upon reference to the drawings in which:

FIG. 2 is a diagrammatical representation of the functional circuitry in a detector of the system of FIG. 1 to produce image data for reconstruction;

DETAILED DESCRIPTION

Figure 1:
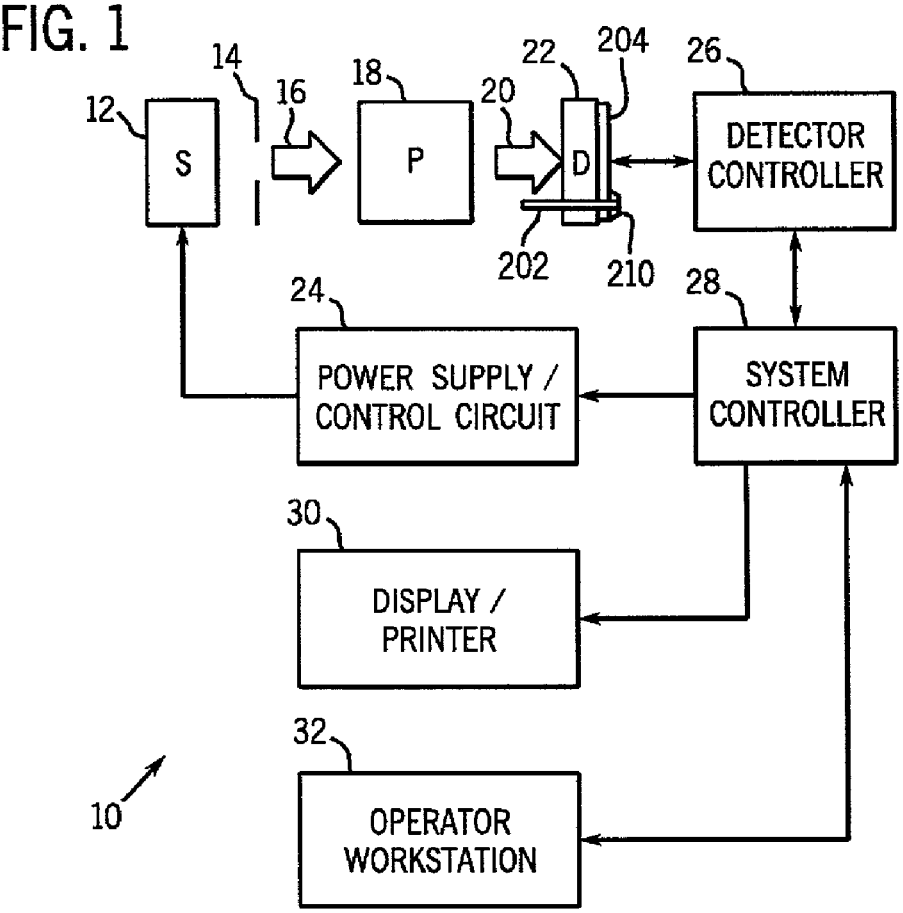
FIG. 1 is a diagrammatical overview of a digital X-ray imaging system in which the present technique may be utilized.

By way of background, FIG. 1 illustrates diagrammatically an imaging system 10 for acquiring and processing discrete pixel image data. For illustration purposes, system 10 is a digital X-ray system designed both to acquire original image data and to process the image data for display in accordance with the present technique. In the embodiment illustrated in FIG. 1, imaging system 10 includes a source of X-ray radiation 12 positioned adjacent to a collimator 14. Collimator 14 permits a stream of radiation 16 to pass into a region in which a subject, such as a human patient 18, is positioned. A portion of the radiation 20 passes through or around the subject and impacts a digital X-ray detector, represented generally at reference numeral 22. As described more fully below, detector 22 converts the X-ray photons received on its surface to lower energy photons, and subsequently to electric signals, which are acquired and processed to reconstruct an image of the features within the subject. In this exemplary embodiment, the system 10 also includes an adjustable support 202, which is coupled to the detector 22 slidingly along a rail structure 204, to provide support for the patient's hands/arms while acquiring an image of the patient 18.

Source 12 is controlled by a power supply/control circuit 24, which furnishes both power, and control signals for examination sequences. Moreover, detector 22 is coupled to a detector controller 26, which commands acquisition of the signals generated in the detector 22. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

FIG. 2 is a diagrammatical representation of functional components of digital detector 22. FIG. 2 also represents an imaging detector controller or IDC 34, which will typically be configured within detector controller 26. IDC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column drivers used to transmit signals during data acquisition phases of operation of the system. Circuitry 36 therefore transmits power and control signals to reference/regulator circuitry 40, and receives digital image pixel data from circuitry 40.

In a present embodiment, detector 22 consists of a scintillator that converts X-ray photons received on the detector surface during examinations to lower energy (light) photons. An array of photodetectors then converts the light photons to electrical signals, which are representative of the number of photons or the intensity of radiation impacting individual pixel regions of the detector surface. Readout electronics convert the resulting analog signals to digital values that can be processed, stored, and displayed, such as in a display 30 or a workstation 32 following reconstruction of the image. In a present form, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics as described below. The drains of the transistors in a column are connected together and an electrode of each column is connected to readout electronics.

In the particular embodiment illustrated in FIG. 2, by way of example, a row bus 42 includes a plurality of conductors for enabling readout from various columns of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector. In the present technique, image acquisition rate is increased by employing a partial readout of the detector 22.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64. Again, as described below, the present technique allows an enhanced number of pixels to be read out via the row and column drivers and readout electronics.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode 74 may be accessed via readout electronics 48, and converted to digital signals for subsequent processing and image reconstruction. Thus, an entire row of pixels in the array is controlled simultaneously when the scan line attached to the gates of all the transistors of pixels on that row is activated. Consequently, each of pixels in that particular row is connected to a data line, through a switch, which is used by the readout electronics to restore the charge to the photodiode 74.

It should be noted that as the charge is restored to all the pixels in one row simultaneously by each of the associated dedicated readout channels, the readout electronics is converting the measurements from the previous row from an analog voltage to a digital value. Furthermore, the readout electronics are transferring the digital values from 2 rows previous to the acquisition subsystem, which will perform some processing prior to displaying a diagnostic image on a monitor or writing it to film. Thus, the read out electronics are performing three functions simultaneously; measuring or restoring the charge for the pixels in a particular row, converting the data for pixels in the previous row and transferring the converted data for the pixels in a twice-previous row.

Figure 3:
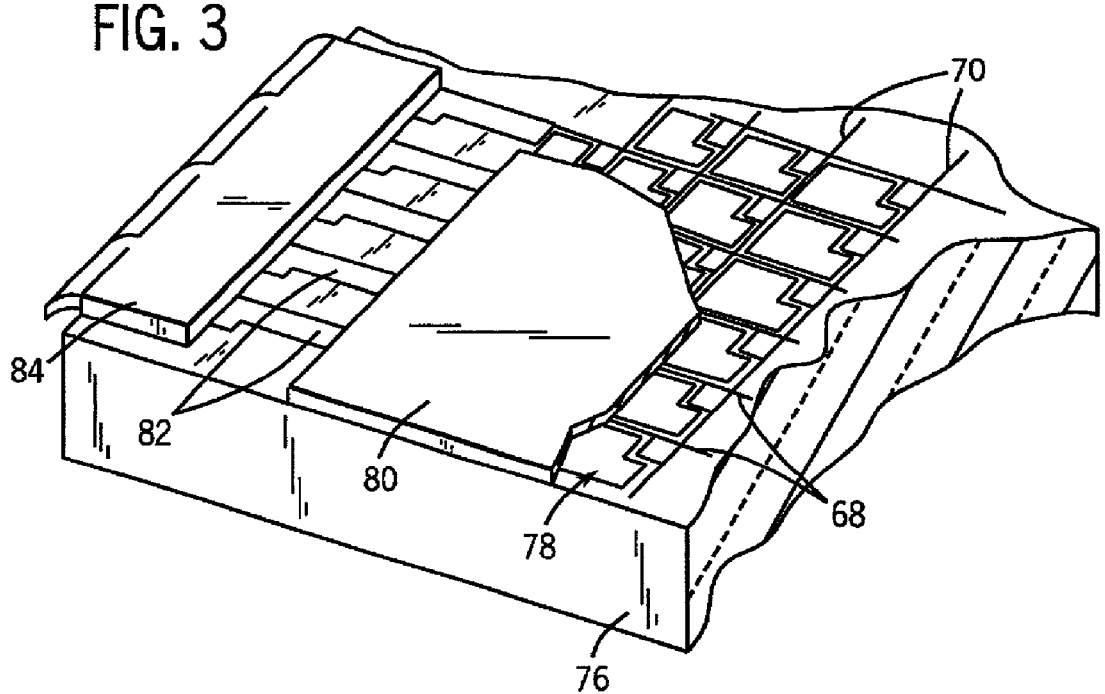
FIG. 3 is a partial sectional view illustrating an exemplary detector structure for producing the image data.

FIG. 3 generally represents an exemplary physical arrangement of the components illustrated diagrammatically in FIG. 2. As shown in FIG. 3, the detector may include a glass substrate 76 on which the components described below are disposed. Column electrodes 68 and row electrodes 70 are provided on the substrate, and an amorphous silicon flat panel array 78 is defined, including the thin film transistors and photodiodes described above. A scintillator 80 is provided over the amorphous silicon array for receiving radiation during examination sequences as described above. Contact fingers 82 are formed for communicating signals to and from the column and row electrodes, and contact leads 84 are provided for communicating the signals between the contact fingers and external circuitry.

It should be noted that the particular configuration of the detector panel 22, and the subdivision of the panel into rows and columns driven by row and column drivers is subject to various alternate configurations. In particular, more or fewer row and column drivers may be used, and detector panels having various matrix dimensions may thereby be defined. The detector panel 22 may be further subdivided into regions of multiple sections, such as along a vertical or horizontal centerline.

It should be further noted that the readout electronics in the detector generally employ a pipeline type architecture. For example, as the charge is restored to all the pixels in a particular row simultaneously by each of the associated dedicated readout channels, the readout electronics convert the measurements from the previous row from an analog signal to a digital signal. Concurrently, the readout electronics transfer the measured digital values from two rows previous to the data acquisition subsystem. The data acquisition subsystem typically performs some processing prior to displaying a diagnostic image on a display. Thus, the readout electronics in the present technique perform three functions simultaneously.

Figure 4:
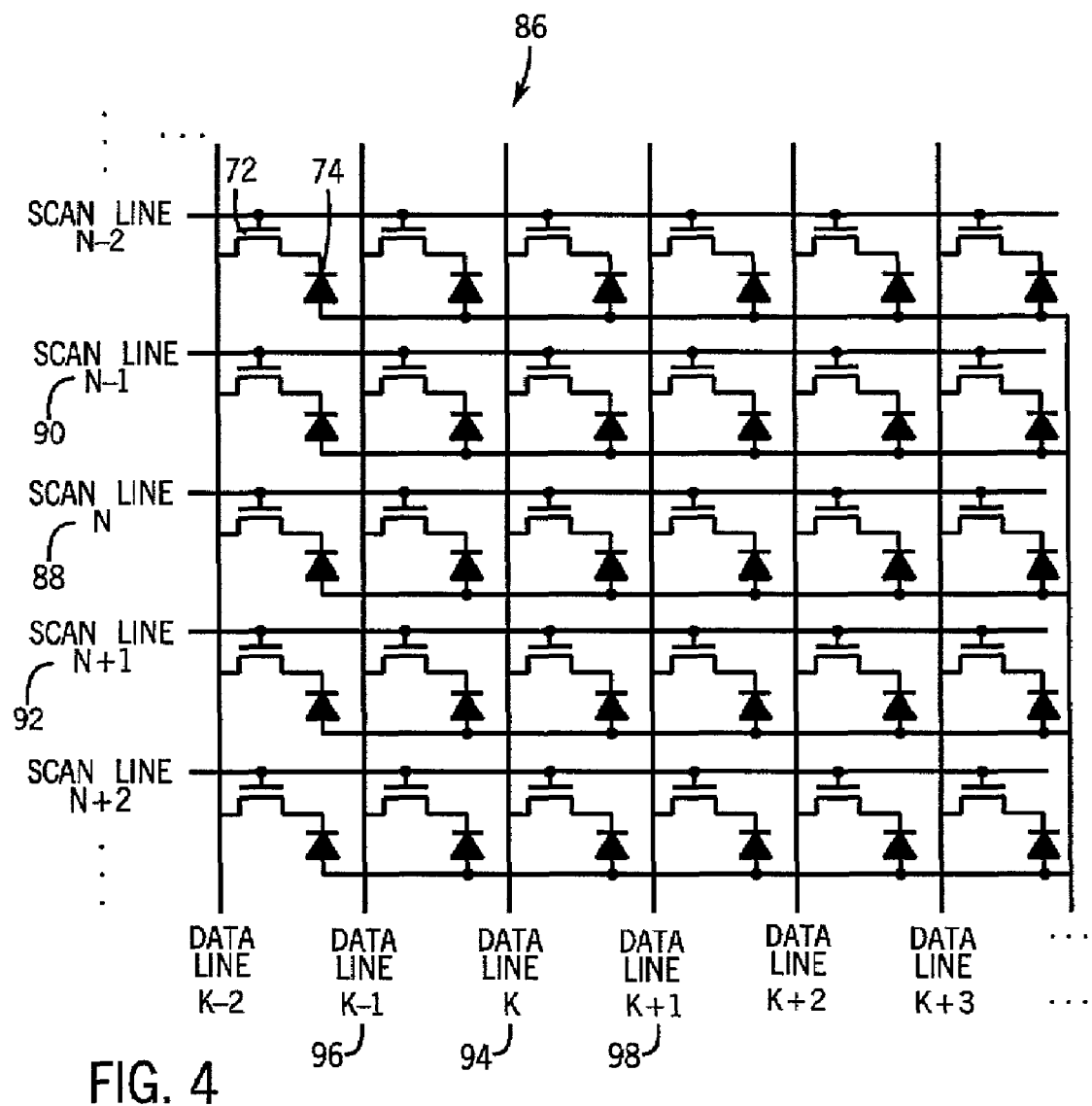
FIG. 4 is a circuit schematic illustrating rows and columns of pixels in an exemplary detector.

FIG. 4 illustrates an array of pixels 86 located on an exemplary detector having a plurality of column lines and row lines. As illustrated by the array of pixels 86, each pixel comprises the transistor 72 and the photodiode 74. It should be noted that the array is made up of a plurality of scan lines 88, 90, 92 and a plurality of data lines 94, 96 and 98. The scan lines 88, 90, 92 represent rows of pixels scanned during the imaging process. Similarly, the data lines 94, 96 and 98 represent the columns of pixels through which data is transmitted to a data acquisition system. As can be appreciated by those skilled in the art, the scan lines typically recharge the photodiode and measure the amount of charge displaced. The column or data lines typically transmit the data from each row of pixels to the data acquisition system.

As illustrated, scan line 88(denoted N in FIG. 4) is coupled to each one of the pixels in that specific row. Additionally, scan line 88 is coupled to each of one of the data lines. For example, scan line 88 is coupled to data line 94 (denoted K in FIG. 4) and data line 98 (K+1). Similarly, each one of the data lines is coupled to each one of the scan lines. Thus, as illustrated for the array of pixels 86, scan line 88 (N), scan line 90 (N−1), and scan line 92 (N+1) are coupled to data line 94 (K), data line 96 (K−1), and data line 98 (K+1) and so on. It should be understood that each data line is typically coupled to one specific column of pixels and each scan line is coupled to one specific row of pixels. Additionally, although in the present embodiment of FIG. 4, 25 pixels are illustrated, it should be noted that additional pixels may, of course, be incorporated in the pixel array.

Figure 5:
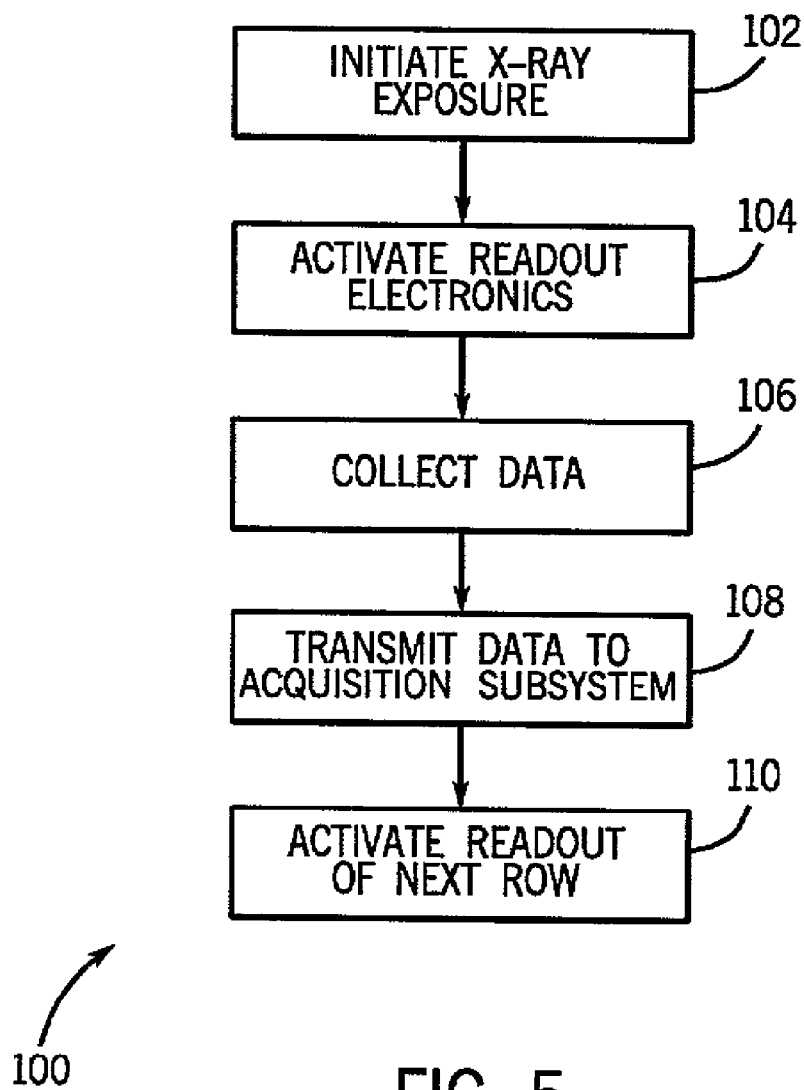
FIG. 5 is a flowchart representing the method of operating an exemplary imaging system for providing image data.
Figure 6:
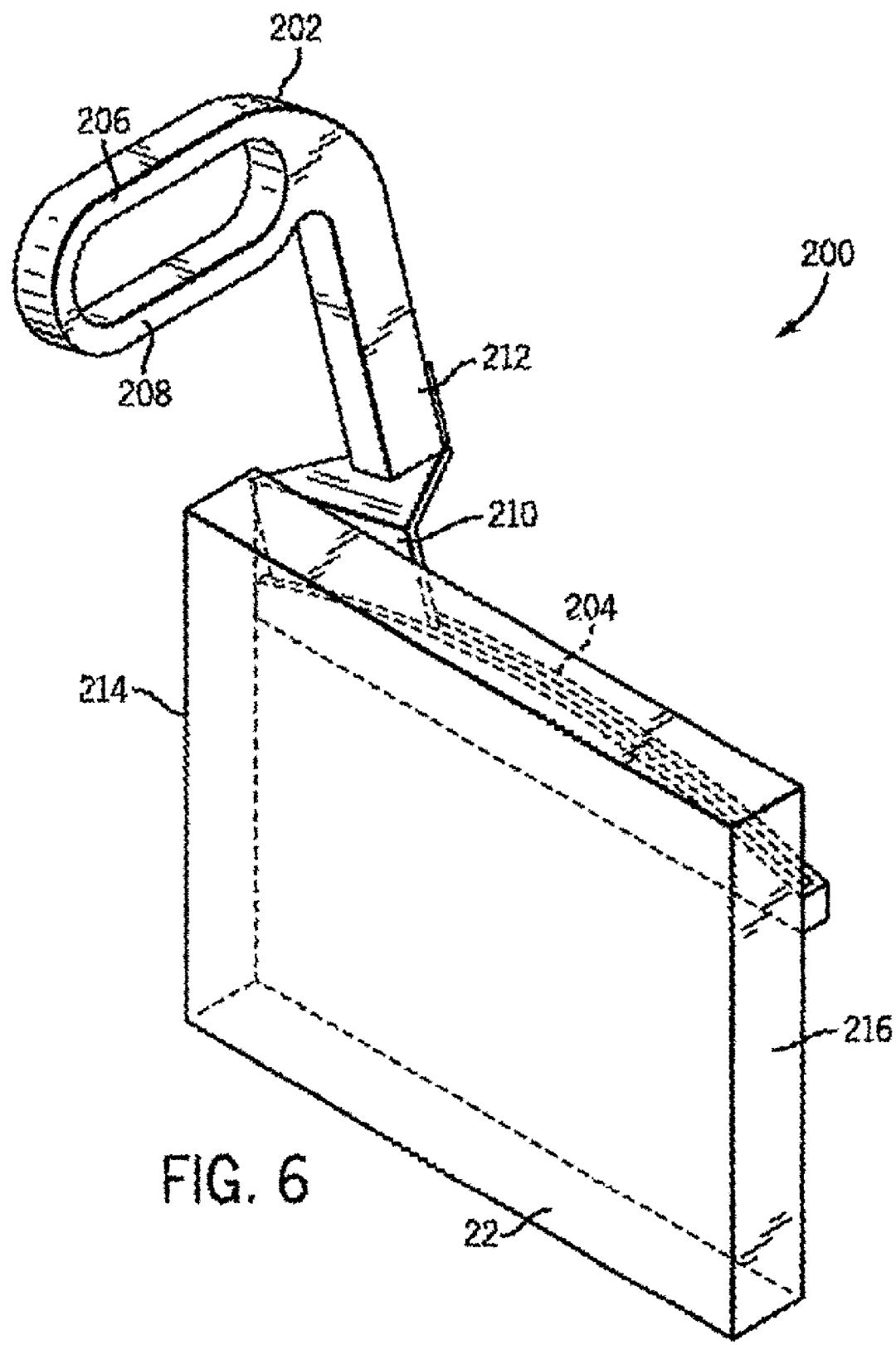
FIG. 6 is a perspective view of an adjustable support slidingly coupled to a rail structure disposed on the detector.

Turning to FIG. 5, a flowchart is represented illustrating a method 100 for operating an imaging system of the type described above. Initially, an X-ray exposure is initiated by an operator, as represented by step 102. Once an X-ray exposure is taken, the readout electronics within the detector 22 are activated, as indicated by step 104. As mentioned above, an exposure is taken of a patient, whereby X-rays are transmitted through the patient and received by the detector. The array of pixels 86 typically measures the attenuation of the X-rays received by the detector 22, via the readout electronics provided within each individual pixel. The readout electronics typically collect data utilizing circuitry associated with each of the pixels, as indicated by step 106. Once the data are collected for a particular row of pixels, the data are transmitted to a data acquisition subsystem as indicated by step 108. Once data from one specific row of pixels is transmitted to the data acquisition subsystem, the next row of pixels is scanned and read. Thus, the readout of the next row of pixels is activated, as indicated by step 110. It should be understood that this process continues until the detector 22, and more particularly all the pixels, are read out. Subsequently, the collected data are processed and ultimately used to reconstruct an image of the exposure area.

In operation, the foregoing imaging system 10 may utilize a variety of patient support structures to orient the patient 18 relative to the detector 22, which may be disposed in a fixed or variable position. For example, the detector 22 may be coupled to a positioning system for moving the detector 22 to a desired orientation relative to the patient 18, while a laterally adjustable support system 200 provides adjustable patient support relative to the detector 22. In this exemplary embodiment, the laterally adjustable support system 200 comprises an adjustable support 202 for positioning the patient's hands and arms so that they do not obstruct the anatomy of interest. The adjustable support 202 is coupled to the detector 22 via the rail structure 204, which extends laterally across the detector 22. Accordingly, the patient's hands may be supported at any lateral position relative to the detector 22 by moving the adjustable support 202 to a desired lateral position along the rail structure 204.

The adjustable support 202 comprises an upper hand grip 206, a lower hand grip 208, a rail guide structure 210 slidingly coupled to the rail structure 204, and a vertical extension arm 212 extending from the rail guide structure 210 to the hand grips 206 and 208. The adjustable support 202 also may comprise an armrest, a vertical adjustment mechanism for the vertical extension arm 212, and any other desired support and positional adjustment features for the particular application and imaging system. Accordingly, the upper and lower hand grips 206 and 208 and the lateral adjustability of the adjustable support 202 accommodate different arm lengths, heights, and other proportions of patients.

Figure 7:
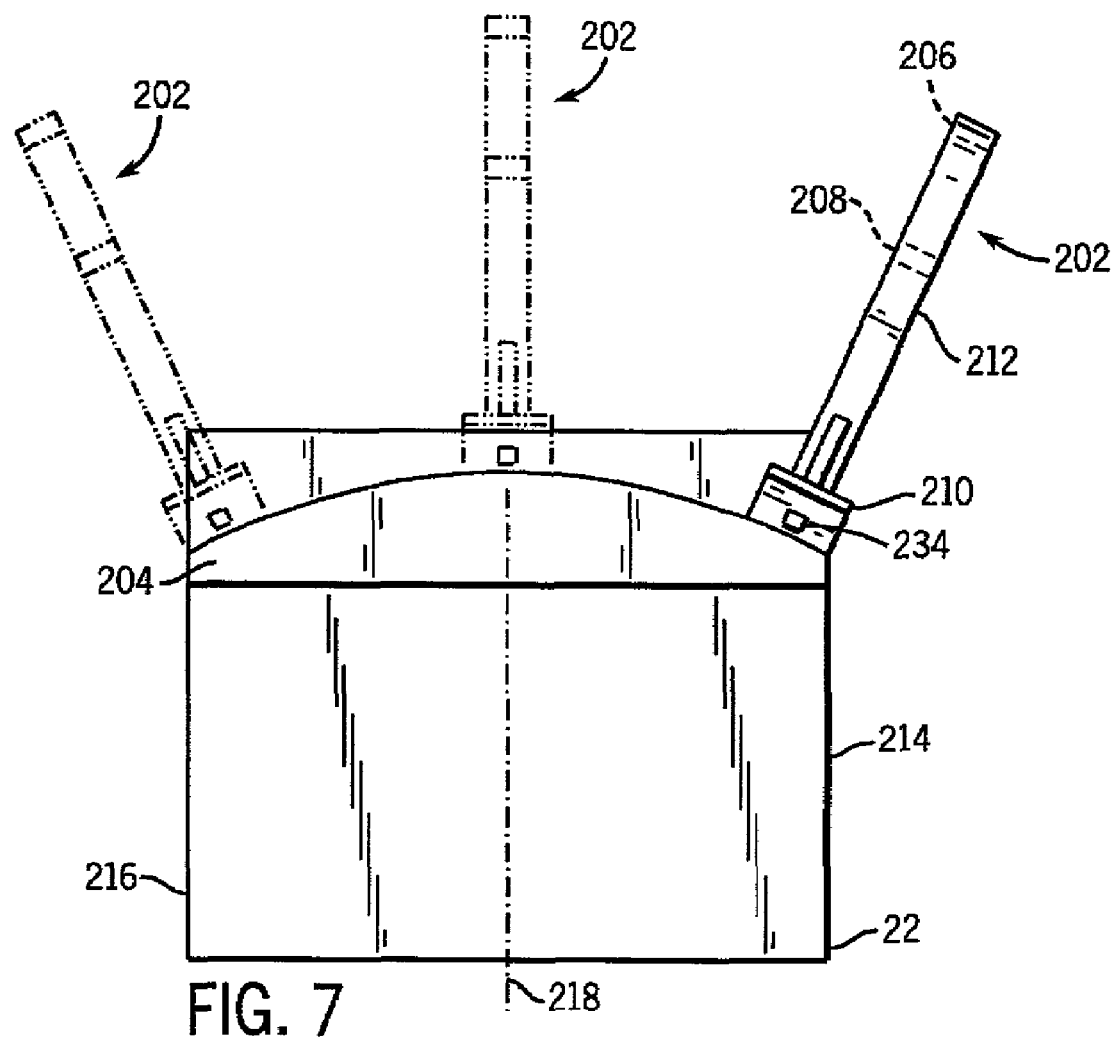
FIG. 7 is a rear view of the adjustable support illustrating various lateral and angular positions of the adjustable support.

The sliding mechanism between the rail structure 204 and the rail guide structure 210 may embody any suitable mechanism, such as linear bearings, for providing linear or curvilinear motion. Moreover, the rail structure 204 may form either a straight or a curved path. In this exemplary embodiment, the rail structure 204 has a curved path (e.g., concave or convex) that extends across the detector 22 symmetrically between sides 214 and 216. FIG. 7 is a rear view of the laterally adjustable support system 200 illustrating the adjustable support 202 in multiple orientations, which facilitate left lateral, center, and right lateral positions of the patient 18 relative to the detector 22. Accordingly, the lateral adjustability of the adjustable support 202 eliminates the need for multiple supports, or the need for removal and reattachment of the support, to accommodate the various positions of the patient relative to the detector 22. It also should be noted that the upper-rear mounting of the adjustable support 202 to the detector 22 facilitates tilting of the detector 22 without removal of the adjustable support 202.

As illustrated, the curved path of the rail structure 204 provides additional adjustability of the adjustable support 202 relative to the detector 22. For example, the curved path of the rail structure 204 increases the range of lateral adjustability of the adjustable support 202 by causing the adjustable support 202 to tilt outwardly from a vertical centerline 218 of the detector 22 as the adjustable support 202 is moved outwardly from the vertical centerline 218 toward the sides 214 and 216. In positions near the sides 214 and 216, the outwardly angled orientation of the adjustable support 202 accommodates longer arms of larger patients, while also supporting the patient's wrists with the lower hand grip 208. The curved path of the rail structure 204 also provides vertical adjustability of the adjustable support 202 relative to the detector 22. As illustrated, the curved path of the rail structure 204 positions the adjustable support 202 at a relatively higher vertical position near the vertical centerline 218 of the detector 22. Accordingly, if the patient is facing toward or away from the detector 22 (i.e., center position), then the relatively higher vertical position of the adjustable support 202 accommodates an over-the-head position of the patient's arms/hands.

Figure 8:
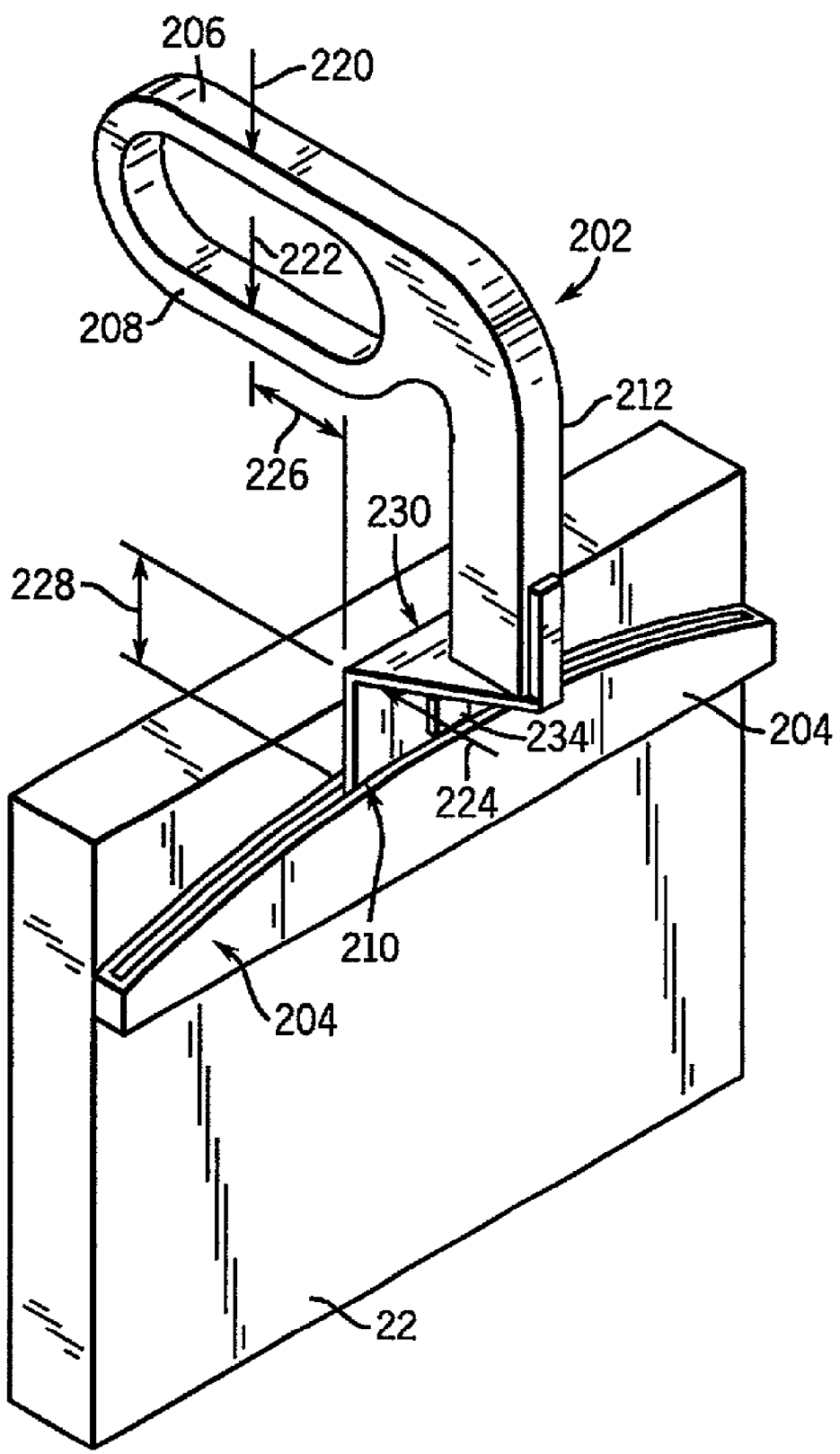
FIG. 8 is a rear perspective view of the adjustable support illustrating a friction-based holding mechanism activated by a patient load applied to the adjustable support.

The laterally adjustable support system 200 may utilize any suitable securement mechanism for securing the adjustable support 202 in a desired position along the rail structure 210. However, in this exemplary embodiment, the laterally adjustable support system 200 has a friction-based securement mechanism. As illustrated by FIG. 8, the geometry of the adjustable support 202 is such that a patient load (e.g., weight of the patient's hands/arms) applied to one of the hand grips 206 and 208, as referenced by arrows 220 and 222, respectively, creates a holding force 224 between the detector 22 and the rail guide structure 210. For example, the geometry of the adjustable support 202 provides a relatively greater distance 226 between the patient load (e.g., arrows 220 and 222) and the rail guide structure 210 than a distance 228 between the holding force 224 and the rail structure 204. Accordingly, a relatively greater holding force 224 (or pressure) is generated between the detector 22 and the rail guide structure 210 as the patient's hands/arms are supported by the adjustable support 202. The holding force 224 (or pressure) may be applied along an edge 230, as illustrated, or at any other point, edge, or area between the detector 22 and the rail guide structure 210. In operation, the holding force 224 secures the adjustable support 202 in the desired position on the rail structure 210 by frictionally preventing the rail guide structure 210 from moving along the rail structure 204. Absent the holding force 224, the adjustable support 202 is laterally adjustable by applying a lateral force on the support 202 to slide the rail guide structure 210 along the rail structure 204.

Figure 9:
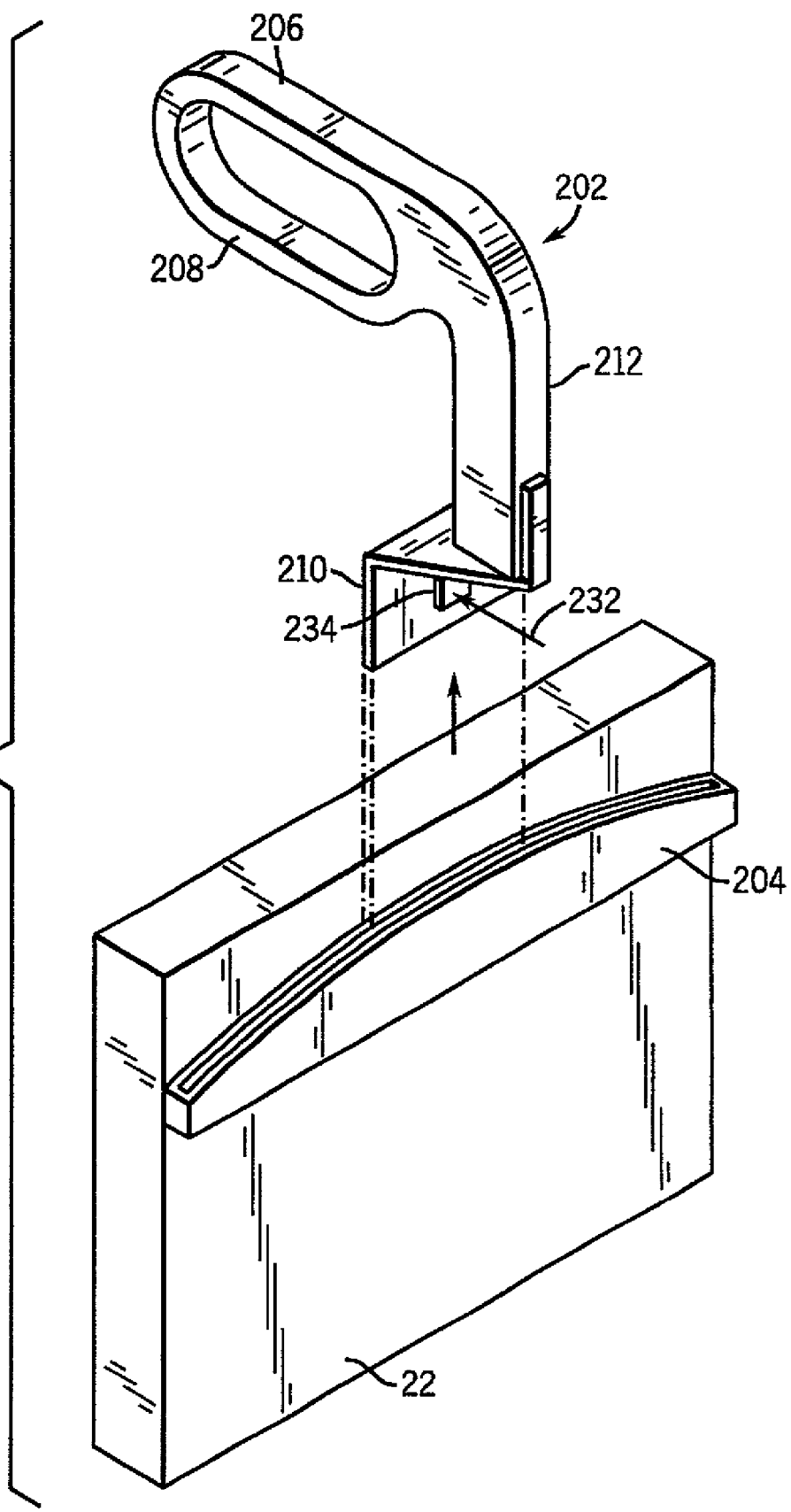
FIG. 9 is a rear perspective view of the adjustable support illustrating a vertical release mechanism.

In certain imaging, configuration, or maintenance procedures, it may be desirable to remove the adjustable support 202 from the detector 22. For example, if the imaging system 10 is being used for procedures involving the abdomen, then it may be desirable to remove the adjustable support 202. As illustrated in FIG. 9, the adjustable support 202 is removable from the rail structure 204 by applying a disengagement force 232 to the disengagement mechanism or button 234. For example, depressing the button 234 may release a hook or a latch structure disposed about the rail structure 204. However, any suitable catch and release mechanism is within the scope of the present technique.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A patient support system for a medical imaging system, comprising:
   a lateral rail structure attachable to a receptor of the medical imaging system; and
   a patient support movably coupled to the lateral rail structure via a rail guide structure, wherein the rail guide structure is releasably coupled to the lateral rail structure via a releasable latch.

2. The patient support system of claim 1, wherein the lateral rail structure has a curvilinear path.

3. The patient support system of claim 2, wherein the curvilinear path is convex.

4. The patient support system of claim 1, wherein the patient support is positionally securable along the lateral rail structure via a friction-based mechanism activated by a patient load applied to the patient support.

5. The patient support system of claim 1, wherein the patient support is continuously movable and securable along the lateral rail structure.

6. The patient support system of claim 1, wherein the patient support is a patient limb support.

7. The patient support system of claim 1, wherein the patient support is a patient extremity support.

8. The patient support system of claim 7, wherein the patient support is adapted to position patient extremity in a non-obstructive location relative to the receptor.

9. The patient support system of claim 1, wherein patient support comprises a plurality of hand grips.

10. The patient support system of claim 9, wherein the plurality of hand grips are disposed at different vertical positions.

11. A patient support for an imaging system, comprising:
a curvilinear rail structure attachable to, and movable with, a radiographic receptor of the imaging system; and
a limb support slidingly coupled to the curvilinear rail structure, wherein the limb support is continuously movable and securable along the curvilinear rail structure.

12. The patient support of claim 11, wherein the curvilinear rail structure has a convex path.

13. The patient support of claim 11, comprising a releasable latch structure coupling the limb support to the curvilinear rail structure.

14. The patient support of claim 11, wherein the limb support is positionally securable along the curvilinear rail structure via a holding mechanism activated by weight of a patient limb supported by the limb support.

15. The patient support of claim 11, wherein the limb support is adapted to position a patient limb in a non-obstructive location relative to the radiographic receptor.

16. The patient support of claim 11, wherein limb support comprises a hand grip.

17. The patient support of claim 11, wherein limb support comprises a wrist support.

18. The patient support of claim 11, wherein the limb support comprises a plurality of lateral support members disposed at different vertical positions.

19. A medical imaging system, comprising:
a radiographic receptor;
a rail structure coupled to the radiographic receptor; and
a patient extremity support slidingly coupled to the rail structure;
wherein the rail structure has a curvilinear path; and
wherein the patient extremity support tiltingly slides along the rail structure with the curvilinear path.

20. The medical imaging system of claim 19, wherein the radiographic receptor is a digital detector assembly.

21. The medical imaging system of claim 19, wherein the radiographic receptor is coupled to a positioning system.

22. The medical imaging system of claim 19, wherein the rail structure is coupled to an upper rear portion of the radiographic receptor.

23. The medical imaging system of claim 19, wherein the curvilinear path is convex.

24. The medical imaging system of claim 19, comprising a releasable latch structure coupling the patient extremity support to the rail structure.

25. The medical imaging system of claim 19, wherein the patient extremity support is frictionally securable along the rail structure via a holding mechanism activated by weight of a patient extremity supported by the patient extremity support.

26. The medical imaging system of claim 19, wherein the patient extremity support is movable in infinitesimal increments along the rail structure.

27. The medical imaging system of claim 19, wherein the patient extremity support is adapted to position a patient limb in a non-obstructive location relative to the radiographic receptor.

28. A method of supporting a patient limb during image acquisition by a medical imaging system, comprising the acts of:
sliding a limb support along a rail structure directly coupled to, and movable with, a radiographic receptor of the medical imaging system; and
securing the limb support in a desired position along the rail structure.

29. The method of claim 28, wherein the act of sliding the limb support along the rail structure comprises the act of sliding the limb support along a curvilinear path.

30. The method of claim 29, wherein the curvilinear path is convex.

31. The method of claim 28, wherein the act of sliding the limb support along the rail structure comprises the act of moving the limb support in infinitesimal increments.

32. The method of claim 28, wherein the act of securing the limb support in the desired position comprises the act of frictionally securing the limb support.

33. The method of claim 32, wherein the act of frictionally securing the limb support is activated by performing the act of supporting the patient limb on the limb support.

34. The method of claim 28, wherein the act of securing the limb support in the desired position comprises the act of positioning a patient limb in a non-obstructive location relative to the radiographic receptor.

35. A method of forming a laterally adjustable limb support for a medical imaging system, comprising the acts of:
providing a lateral rail structure attachable to a receptor of the medical imaging system wherein the lateral rail structure has a curvilinear path;
providing a friction-based securement mechanism to secure the limb support at a desired position along the lateral rail structure; and
slidingly coupling a limb support to the lateral rail structure.

36. The method of claim 35, wherein the curvilinear path is convex.

37. The method of claim 35, comprising the act of providing a vertical release mechanism to facilitate vertical release of the limb support from the lateral rail structure.

38. The method of claim 35, wherein the act of providing a friction-based securement mechanism comprises the act of creating a holding force between the limb support and the receptor as a patient load is applied to the limb support.

* * * * *